United States Patent
Brownlow et al.

(10) Patent No.: US 9,712,612 B2
(45) Date of Patent: Jul. 18, 2017

(54) METHOD FOR IMPROVING MOBILE NETWORK PERFORMANCE VIA AD-HOC PEER-TO-PEER REQUEST PARTITIONING

(75) Inventors: Sean T. Brownlow, Rochester, MN (US); John E. Petri, St. Charles, MN (US); Kevin Wendzel, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 664 days.

(21) Appl. No.: 13/568,780

(22) Filed: Aug. 7, 2012

(65) Prior Publication Data

US 2014/0047059 A1 Feb. 13, 2014

(51) Int. Cl.
*G06F 15/173* (2006.01)
*H04L 29/08* (2006.01)

(52) U.S. Cl.
CPC ........ *H04L 67/1078* (2013.01); *H04L 67/108* (2013.01); *H04L 67/1074* (2013.01)

(58) Field of Classification Search
CPC ............. H04L 67/1078; H04L 67/1074; H04L 67/108
USPC ....... 709/203, 204, 219, 202, 206, 212, 214, 709/216, 218, 220, 224, 228, 231, 239
See application file for complete search history.

(56) References Cited

U.S. PATENT DOCUMENTS

| | | | |
|---|---|---|---|
| 6,438,594 B1 * | 8/2002 | Bowman-Amuah | ......... 709/225 |
| 7,633,908 B1 | 12/2009 | Kwong et al. | |
| 7,783,777 B1 | 8/2010 | Pabla et al. | |
| 7,818,402 B1 * | 10/2010 | Zhang | ................. H04L 61/1582 |
| 7,904,078 B2 | 3/2011 | Jendbro et al. | |
| 8,169,916 B1 * | 5/2012 | Pai et al. | ....................... 370/238 |
| 2003/0023728 A1 * | 1/2003 | Yaung | .................... G06Q 10/06 709/226 |
| 2007/0195731 A1 * | 8/2007 | Camp, Jr. | ............. H04W 72/04 370/329 |
| 2008/0104170 A1 * | 5/2008 | Ananthanarayanan | . H04L 67/06 |
| 2008/0298327 A1 * | 12/2008 | Dawson et al. | ...... H04L 67/104 |
| 2009/0013034 A1 * | 1/2009 | Cheng et al. | ........... H04L 67/02 |
| 2010/0070628 A1 * | 3/2010 | Harrang et al. | ........ H04L 47/10 |
| 2010/0153415 A1 * | 6/2010 | Muntz | ................. H04L 67/1097 707/758 |
| 2012/0066495 A1 * | 3/2012 | Hao et al. | ............. H04L 9/0827 |

* cited by examiner

*Primary Examiner* — Chris Parry
*Assistant Examiner* — Soe M Hlaing
(74) *Attorney, Agent, or Firm* — Patterson + Sheridan, LLP (57) ABSTRACT

Method, computer program product, and system for identifying, responsive to a request for a network resource, at least one peer device, wherein the request is made by a first device on a mobile network, the at least one peer device on a local network with the first device, the local network different than the mobile network; partitioning, based on at least one content element of the requested network resource, the request into a plurality of subrequests, each subrequest specifying to retrieve one or more content elements of the requested network resource; assigning each subrequest to one of the peer devices and the first device, wherein each peer device and the first device retrieves the content elements specified by the subrequest assigned to the respective device, wherein each peer device transmits the retrieved portion of the network resource to the first device over the local network.

24 Claims, 6 Drawing Sheets

METHOD FOR IMPROVING MOBILE NETWORK PERFORMANCE VIA AD-HOC PEER-TO-PEER REQUEST PARTITIONING

BACKGROUND

The field of the current disclosure relates to mobile networks. Specifically, embodiments disclosed herein relate to improving mobile network performance via ad-hoc peer-to-peer request partitioning.

Traditional ways of improving mobile network performance involve upgrading the network infrastructure. Although these changes are beneficial, they are very costly to network providers. Even with such upgrades, data transfer rates on mobile networks lag significantly behind broadband and other connections.

SUMMARY

Embodiments disclosed herein provide a method, computer program product, and system for performing an operation, the operation including identifying, responsive to a request to retrieve a network resource, at least one participating peer device, wherein the request is made by a first device on a mobile network, wherein the at least one participating peer device is on a local network with the first device, wherein the local network is different than the mobile network. The operation then partitions, based on at least one content element of the requested network resource, the request into a plurality of subrequests, wherein each of the plurality of subrequests specifies to retrieve one or more content elements of the requested network resource. The operation then assigns each of the plurality of subrequests to one of the participating peer devices and the first device, wherein each of the at least one participating peer devices and the first device retrieves the content elements specified by the subrequest assigned to the respective device, wherein each of the at least one participating peer devices transmits the retrieved portion of the network resource to the first device over the local network.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments disclosed herein provide a method, computer program product, and system for performing an operation, the operation including identifying, responsive to a request to retrieve a network resource, at least one participating peer device, wherein the request is made by a first device on a mobile network, wherein the at least one participating peer device is on a local network with the first device, wherein the local network is different than the mobile network. The operation then partitions, based on at least one content element of the requested network resource, the request into a plurality of subrequests by operation of one or more computer processors, wherein each of the plurality of subrequests specifies to retrieve one or more content elements of the requested network resource. The operation then assigns each of the plurality of subrequests to one of the participating peer devices and the first device, wherein each of the at least one participating peer devices and the first device retrieves the content elements specified by the subrequest assigned to the respective device, wherein each of the at least one participating peer devices transmits the retrieved portion of the network resource to the first device over the local network.

Embodiments disclosed herein disclose techniques to reduce download time for devices connected to a wireless mobile network via the intelligent splitting of requests for resources among peers. By operating in such a manner, resources are downloaded by various devices on separate connections in real-time and in an ad-hoc fashion.

In embodiments disclosed herein, when a mobile device makes a network request (the requesting device), other nearby devices are identified that can participate in the request. Upon determining peer participation, the request is then divided among the participating peers. When the various downloads complete, the participating peer devices transmit the resources to the requesting device via a local connection, maximizing bandwidth and download performance for the original requesting device.

For example, the requesting device may request a web page containing text, images, and video. Embodiments disclosed herein may determine that the page markup and text are to be downloaded by the requesting device, while delegating the download of images to a second peer device, and the download of the video to a third peer device. When the second and third peer devices complete their downloads, they transmit the resources back to the requesting device via a local connection where the full page is assembled and viewed by the user.

In addition to working with content such as web pages that are naturally composed of multiple resources, embodiments disclosed herein also provide a server push mechanism for splitting individual large resources like videos, presentations, and PDF files into parts that can be pushed out asynchronously across the peer network to improve download time. In much the same way as described above, when a requesting device requests a large individual resource, embodiments disclosed herein determine if there are other devices that may participate in the request. Once the peer network is established, the various split parts are asynchronously pushed down to the mobile devices. After the downloaded parts have been transmitted from the participating peers to the requesting device via a local connection, the requesting device combines them into a single file again. In this way, even the download performance for a single large file can be improved over mobile networks.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications for improving mobile network performance or related data available in the cloud. For example, the application for improving network performance could execute on a computing system in the cloud and split network requests among local peer devices to improve network performance. In such a case, the application for improving mobile network performance could split network requests among local peer devices and store large files for subsequent requests at a storage location in the cloud. Doing so allows a user to access this information from any computing system attached to a network connected to the cloud (e.g., the Internet).

Figure 1A:
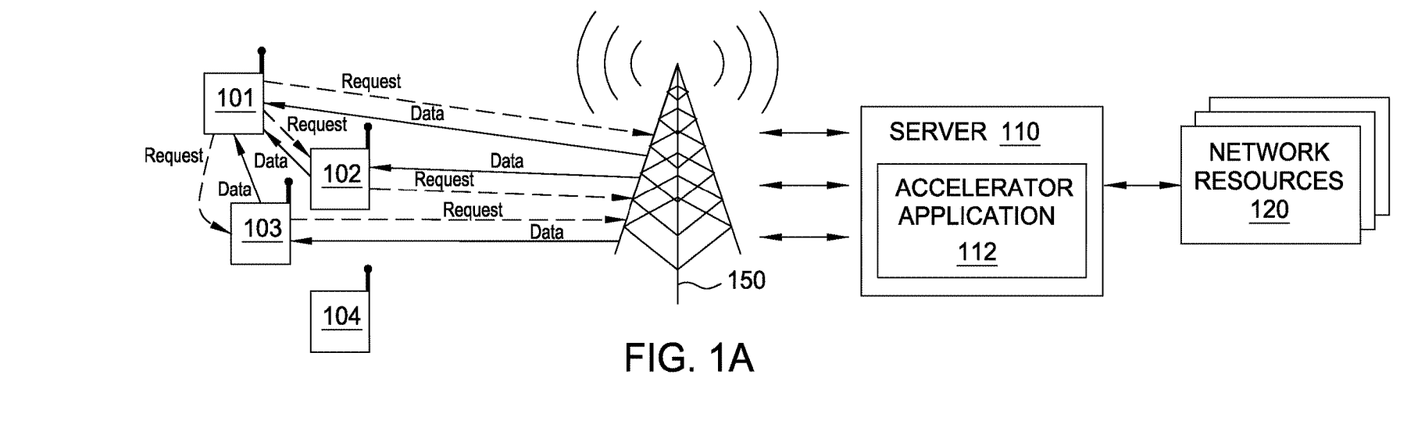
FIGS. 1A-1B are block diagrams depicting interactions between devices for improving mobile network performance via ad-hoc peer-to-peer request partitioning, according to one embodiment disclosed herein.

FIG. 1A is a block diagram depicting interaction between devices on a mobile network, according to one embodiment disclosed herein. As shown, there are a plurality of mobile devices 101-104 all within proximity of each other. The mobile devices 101-104 include any computing device capable of accessing a cellular network, including, but not limited to mobile phones, personal digital assistants (PDA), computers, tablets, and eReaders. Each of the mobile devices 101-104 are connected to a cellular network via cellular tower 150. The cellular tower 150 is in turn connected to a server 110, which includes the accelerator application 112. As shown, the mobile device 101 generates a network request for a network resource, indicated by a dotted line. The mobile device then splits the request, generating several subrequests which represent a portion of the original request. Upon splitting the request, the subrequests (again indicated by a dotted line) are sent to the mobile devices 102 and 103. Additionally, the mobile device 101 retains one or more subrequests of its own. Each of the mobile devices 101-103 then submits its respective request to the cellular tower 150, which in turn forwards the subrequests to the server 110. The server may return the portion of network resource 120 to the mobile devices 101-103 through the cellular tower 150. Upon completing their respective transfers, mobile devices 102-103 will transmit their portions of the network resource 120 via a local network to the mobile device 101. The local network may be IEEE 802.11 wireless, BLUETOOTH™, or any other suitable wireless network. Once the mobile device 101 receives all portions of the file, the mobile device 101 reassembles the portions to complete the transfer. The mobile device 101 may use any method suitable for reassembling the file, including but not limited to, reassembling a file which has been split into multiple smaller files, each smaller file named uniquely to indicate the order in which they need to be reassembled in.

In some embodiments, the request includes a resource which exceeds a predefined size threshold, the server may retrieve the resource, partition the resource, and send the partitioned portions to the plurality of mobile devices 101-103, which will be transmitted to mobile device 101, where it is reassembled.

As shown, mobile device 104 is not sent a request, which may be for any number of reasons, including, but not limited to, the owner of the mobile device 104 declining to participate, the mobile device 104 currently having a high network usage, the mobile device 104 leaving the current location, etc.

Figure 1B:
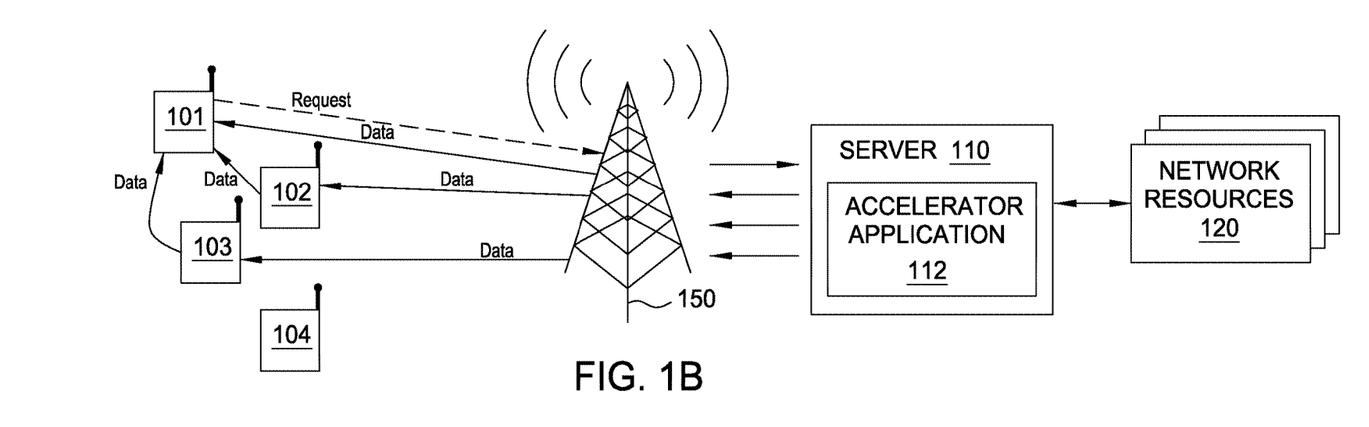

FIG. 1B is a block diagram depicting interaction between devices on a mobile network, according to one embodiment disclosed herein. As shown, there are a plurality of mobile devices 101-104 all within proximity of each other. Proximity, as used herein, may be defined as a physical range suitable for establishing and maintaining a local connection, or the ability to join the same local (or personal) area network as the requesting device. The mobile devices 101-104 include any computing device capable of accessing a cellular network, including, but not limited to telephones, personal digital assistants (PDA), computers, tablets, and eReaders. Each of the mobile devices 101-104 are connected to a cellular network via cellular tower 150. The cellular tower 150 is in turn connected to the server 110, which includes the accelerator application 112. As shown, the mobile device 101 generates a network request, denoted by a dotted line, which is sent to the server 110 through the cellular tower 150. The accelerator application 112, residing within the server 110, receives and partitions the request among the devices 101-103. The server 110 then retrieves the network resource 120, and transmits the corresponding portions to the mobile devices 101-103. Upon completing their respective transfers, mobile devices 102-103 will transmit the resources via a local network to the mobile device 101. Once the mobile device 101 receives all components of the network resource 120, the mobile device 101 reassembles the portions to complete the transfer. If a component of the network resource 120 exceeds a predefined size threshold, the accelerator application 112 may partition the resource into smaller pieces, which are sent to the mobile devices 101-103. Upon completing the download of the portions of content corresponding to their subrequest, the mobile devices 102-103 send the content to the mobile device 101, which assembles it for use.

Figure 2:
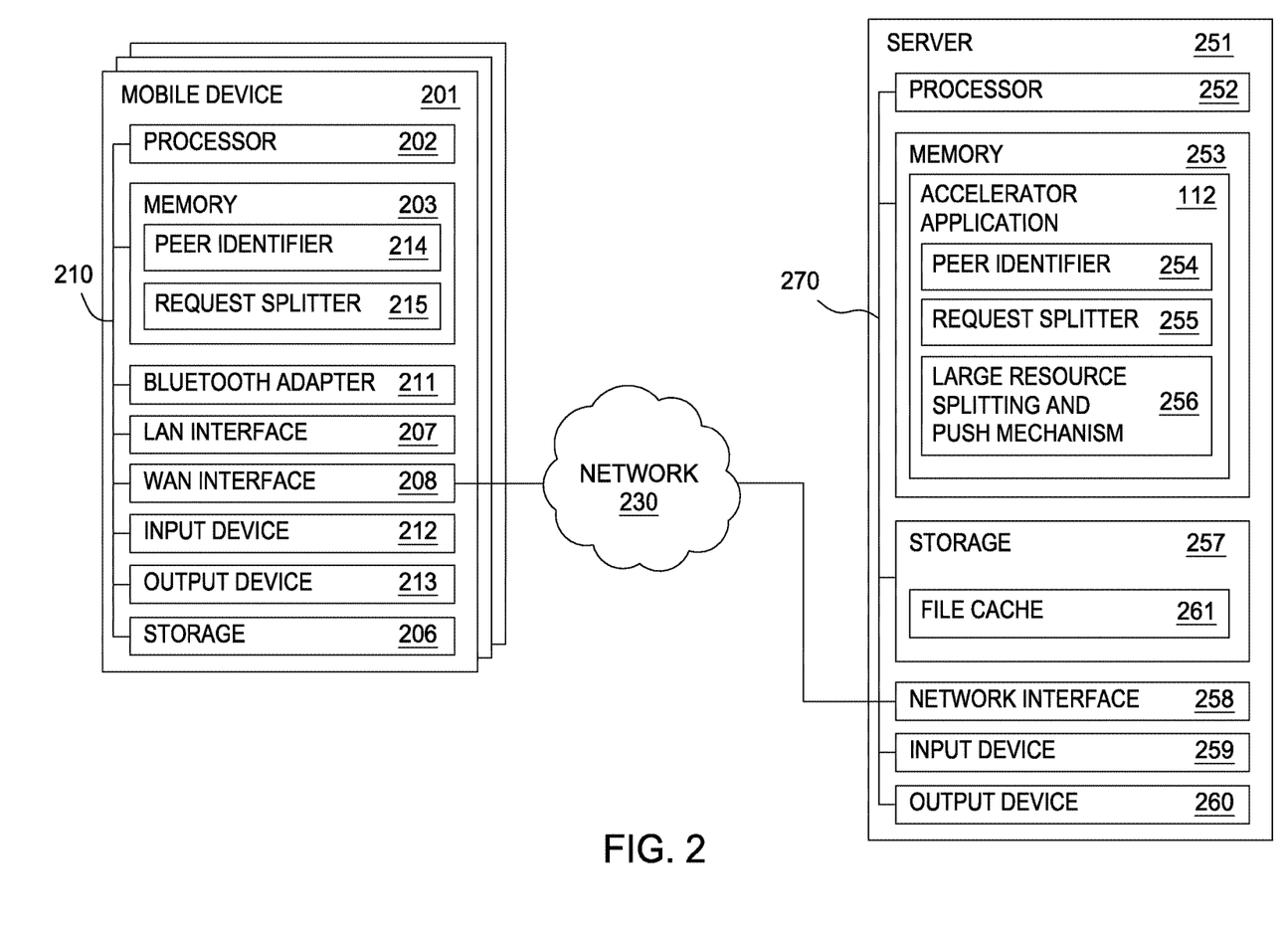
FIG. 2 is a block diagram of a system for improving mobile network performance via ad-hoc peer-to-peer request partitioning, according to one embodiment disclosed herein.

FIG. 2 is a block diagram of a system for improving mobile network performance via ad-hoc peer-to-peer request partitioning, according to one embodiment disclosed herein. As shown, the system includes a plurality of mobile devices 201. Each mobile device 201 generally includes a processor 202 connected via a bus 210 to a memory 203, a local area network (LAN) interface device 207, a wide area network (WAN) interface device 208, a storage 206, a Bluetooth adapter 211, an input device 212, and an output device 213. In some embodiments, the LAN interface device 207 and WAN interface device 208 may be wired or wireless, and in some embodiments may be the same device. The wide area network interface device 208 may be any type of network communications device allowing the mobile device 201 to communicate with other computers via the network 230. As shown, the memory 203 also contains peer identifier 214 and request splitter 215. The peer identifier is an application generally configured to detect participating peer devices within range of the mobile device 201. The request splitter 215 is an application generally configured to split a request for network resources, which is then sent to the participating peer devices. As further described below, in some embodiments, the peer identifier 214 and request splitter 215 may reside on a server 251.

The server 251 generally includes a processor 252 connected via a bus 270 to a memory 253, a storage 257, a network interface device 258, an input device 259, and an output device 260. As shown, the memory 253 includes the accelerator application 112, the components of which includes peer identifier 254, request splitter 255, and large resource splitting and push mechanism 256. Although shown as part of the accelerator application 112, the peer identifier 254, request splitter 255, and large resource splitting and push mechanism 256 may each be separate stand-alone applications in some embodiments. In some embodiments, the functionality of the peer identifier 254, the request splitter 255, and the large resource splitting and push mechanism 256 may be combined into a single application. The accelerator application 112 is generally configured to split network requests among identified participating peer devices to improve network performance. The peer identifier 254 is generally configured to detect participating peer devices within range of the requesting mobile device. The request splitter 255 is generally configured to split a request for network resources among participating peer devices. The large resource splitting and push mechanism 256 is generally configured to retrieve resources exceeding a predefined size threshold, split the large resource into pieces, and transmit the pieces to participating peer devices. As shown, the storage 257 includes file cache 261, which is used to store large files which may be split when requested by a mobile device, the pieces of which may be pushed to peer mobile devices, according to embodiments disclosed herein.

The mobile device 201 and server 251 are generally under the control of an operating system (not shown). Examples of operating systems include UNIX™, versions of the MICROSOFT™ WINDOWS™ operating system, and distributions of the LINUX™ operating system. (UNIX is a registered trademark of The Open Group in the United States and other countries. LINUX is a registered trademark of Linus Torvalds in the United States, other countries, or both. MICROSOFT and WINDOWS are trademarks of Microsoft Corporation in the United States, other countries, or both.) More generally, any operating system supporting the functions disclosed herein may be used. The processors 202 and 252 are included to be representative of a single CPU, multiple CPUs, a single CPU having multiple processing cores, and the like. Similarly, the memories 203 and 253 may be a random access memory. While the memories 203 and 253 are shown as a single entity, it should be understood that the memories 203 and 253 may each comprise a plurality of modules, and that the memories 203 and 253 each may exist at multiple levels, from high speed registers and caches to lower speed but larger DRAM chips.

The storage 206 and 257 and may be a hard disk drive storage device. Although the storage 206 and 257 are each shown as a single unit, the storage 206 and 257 may each be a combination of fixed and/or removable storage devices, such as fixed disc drives, removable memory cards, optical storage, flash memory or solid state storage devices (SSD). The memory 203 and 253 and the storage 206 and 257 may be part of one virtual address space spanning multiple primary and secondary storage devices. In many cases storage can also be a storage area network (SAN) with one or multiple file systems.

The input devices 212 and 259 may be any device for providing input to the mobile device 201 and server 251, respectively. For example, a keyboard, keypad, light pen, touch-screen, track-ball, or speech recognition unit, audio/video player, and the like may be used. The output devices 213 and 260 may be any device for providing output to a user of the mobile device 201 and server 251. For example, the output devices 213 and 260 may be any conventional display screen or set of speakers, along with their respective interface cards, i.e., video cards and sound cards. Although shown separately from the input devices 212 and 259, the output devices 213 and 260 and input devices 212 and 259 may be combined. For example, a display screen with an integrated touch-screen, a display with an integrated keyboard, or a speech recognition unit combined with a text speech converter may be used.

Figure 3:
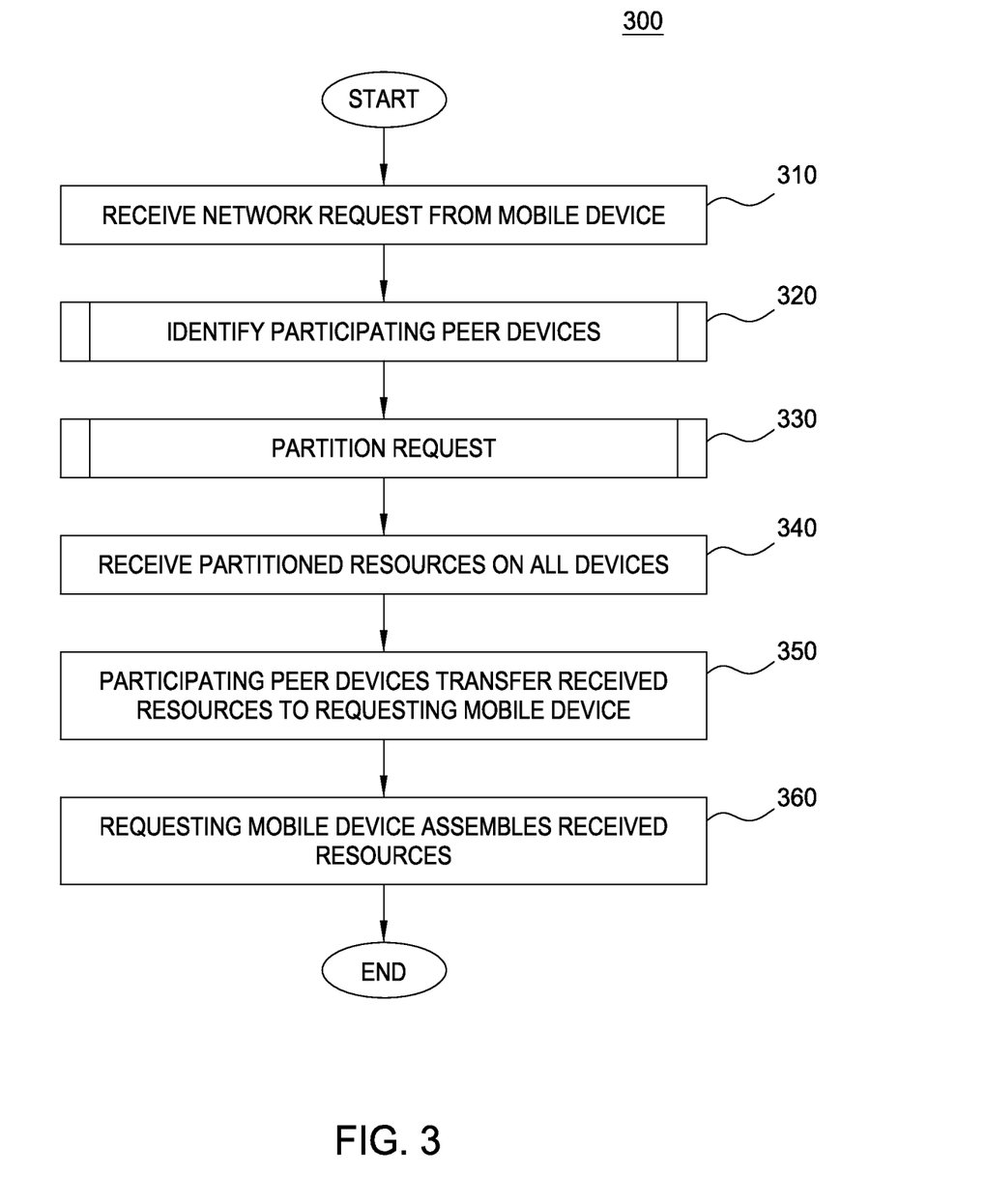
FIG. 3 is a flow chart depicting a method for improving mobile network performance via ad-hoc peer-to-peer request partitioning.

FIG. 3 is a flow chart depicting a method 300 for improving mobile network performance via ad-hoc peer-to-peer request partitioning. In some embodiments, the accelerator application 112, or one of its constituent components, performs the steps of the method 300. At step 310, the accelerator application 112 receives a request for a network resource from a mobile device. At step 320, the accelerator application 112 identifies participating peer devices. As disclosed in FIG. 1A, the mobile device may itself identify participating peer devices based on a number of criteria. The identification of participating peer devices is described in further detail with reference to FIG. 4. At step 330, the accelerator application 112 partitions the request into a plurality of subrequests, which in some embodiments, corresponds to the number of identified participating peer devices. Partitioning is discussed in further detail with reference to FIG. 5. At step 350, the partitioned resources are received by the participating mobile devices, as well as the requesting device. In some embodiments, a push mechanism may be used to send files to mobile devices. The push mechanism allows the server 251 to initiate the transfer to the mobile devices without receiving a request from the mobile device. In some embodiments a pull mechanism may also be used, whereby the mobile device initiates the download of the partitioned resource on its own. At step 350, the participating peer devices transfer the received resources to the requesting mobile device. At step 360, the requesting mobile device assembles the received resources to complete the requested resource.

Figure 4:
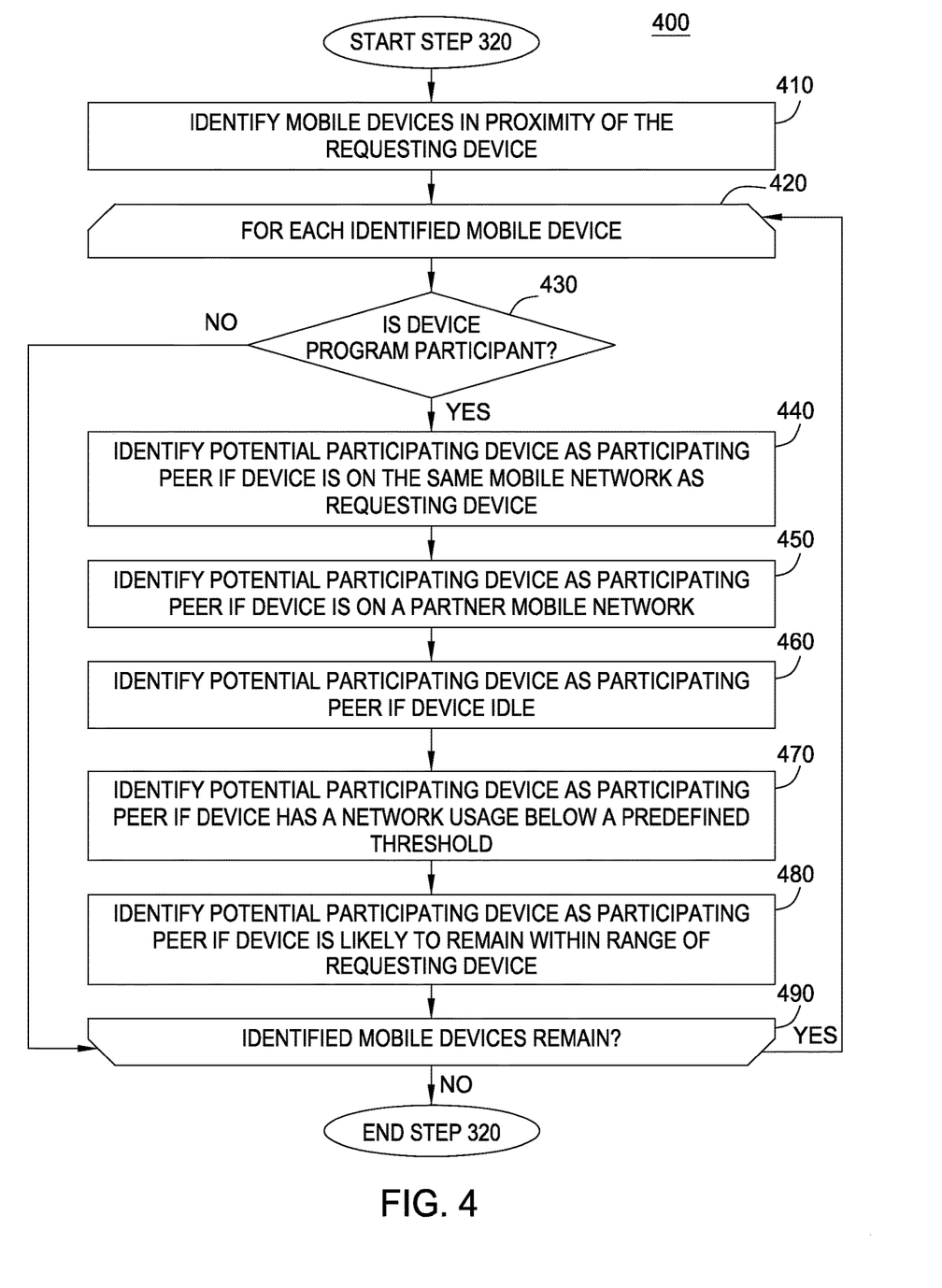
FIG. 4 is a flow chart depicting a method for identifying participating peer devices, according to one embodiment disclosed herein.

FIG. 4 is a flow chart depicting a method 400 corresponding to step 320 for identifying participating peer devices, according to one embodiment disclosed herein. In some embodiments, the peer identifier 254 performs the steps of the method 400. In some embodiments, the peer identifier 254 resides on the mobile device. In other embodiments, the peer identifier 254 executes on a system in the cellular network. At step 410, the peer identifier 254 identifies mobile devices in proximity of the requesting device by sending a request for devices using the same protocol (Bluetooth, WiFi, cellular connection) in order to negotiate participation. In embodiments where the peer identifier 254 is executing on the mobile device, the peer identifier 254 may scan local wireless networks and Bluetooth networks to detect nearby mobile devices. In embodiments where the peer identifier 254 is executing on the cellular network, the peer identifier 254 may access cellular towers for devices sharing the same tower as the requesting device, access GPS data to find devices in proximity with the requesting device, triangulate proximity of devices within range of several towers, or any number of other methods to identify nearby devices. At step 420, the peer identifier 254 begins executing a loop including steps 430-480 for each mobile device identified to be in proximity with the requesting device. In executing the loop, the peer identifier 254 may identify participating peer devices to split the network request with. Although the steps of the loop are depicted as a flow chart, one, several or all of the steps may be used to identify a participating peer device. At step 430, the peer identifier 254 determines whether the identified device is a participant in the request splitting program. This may include checking records in the cellular network provider's database corresponding to the mobile device, or may involve sending a request to the mobile device to determine whether it is a program participant. If the device is not a program participant, the method proceeds to step 480. If the device is a program participant, the device is identified as a potential participating device, and the method proceeds to step 440. In some embodiments, if the device is a potential participant, the device may be identified as a participating peer device automatically, without further investigation.

At step 440, the peer identifier 254 identifies the potential participating device as a participating peer device if the device is on the same mobile network as the requesting device. At step 450, the peer identifier 254 identifies the potential participating device as a participating peer device if the device is on a mobile network different than that of the requesting device, but the network providers have a cost-sharing agreement in place to charge the requesting device for network usage. At step 460, the peer identifier 254 identifies the potential participating device as a participating peer device if the device is idle. By selecting a device which is idle, the file transfer will not slow down any other transfers for the user of that device, and also not impact the partitioned transfer for the requesting user. At step 470, the peer identifier 254 identifies the potential participating device as a participating peer device if the device has a network usage below a predefined threshold. By selecting devices which have a current network usage below a predefined threshold, the peer identifier 254 can ensure that the transfers on the participating peers will not be adversely affected by other transfers, and will complete in a timely manner. At step 480, the peer identifier 254 identifies the potential participating device as a participating peer device if the device is likely to stay within range of the requesting device. For example, the peer identifier 254 may determine, based on the rate of change of cellular network towers by the device (or requesting device), that the device is traveling at a high rate of speed and will likely be out of range of the requesting device. By ensuring that the potential participating device will remain within range of the requesting device, the peer identifier 254 ensures that there will be an available connection over which the device can transfer the received content to the requesting device. At step 490, the peer identifier 254 determines whether more identified mobile devices remain. If more remain, the peer identifier 254 returns to step 420. Otherwise, the method ends.

Figure 5:
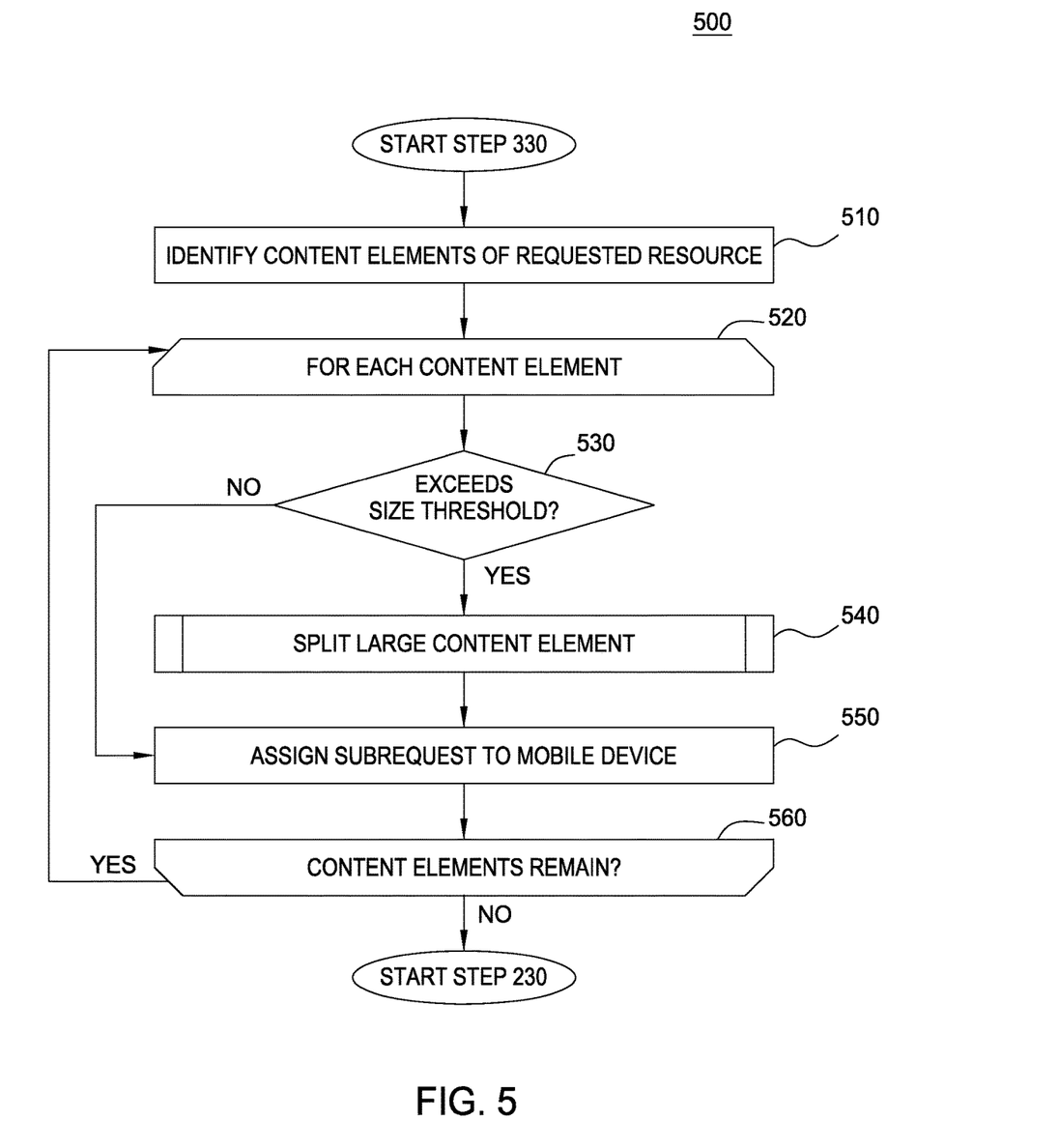
FIG. 5 is a flow chart depicting a method for partitioning a request, according to one embodiment disclosed herein.

FIG. 5 is a flow chart depicting a method 500 corresponding to step 330 for partitioning a request, according to one embodiment disclosed herein. In some embodiments, the request splitter 255 performs the steps of the method 500. At step 510, the request splitter 255 identifies the content elements of the requested network resource. For example, the original requesting device may request a web page containing text, images and video. The request splitter 255 may identify the text as one content element, the images as another content element, and the video as another content element. The request splitter 255 may identify each image as a separate content element, or identify them collectively as a single content element. At step 520, the request splitter 255 begins executing a loop containing steps 530-560 for each content element identified in the requested network resource at step 510. At step 530, the request splitter 255 determines whether the content element exceeds a predefined size threshold. A size threshold may be implemented to partition content elements exceeding the threshold, so as to improve the transfer time of these larger content elements. If the content element exceeds the predefined size threshold, the method proceeds to step 540. If the content element does not exceed the predefined size threshold, the method proceeds to step 550. At step 540, described in further detail with reference to FIG. 6, the large content element is split. At step 550, the request splitter 255 assigns a subrequest to retrieve the content element to a mobile device. The mobile device may be the requesting device or a participating peer device. The request splitter 255 may assign a subrequest for the content element based on any number of factors, including, but not limited to, transfer speeds of the mobile device, the number of subrequests assigned to the mobile device, the number of additional mobile devices available, and the number of additional content elements remaining to be assigned. If the content element is a large resource which has been split, the request splitter 255 may assign each portion to a mobile device, and the large resource splitting and push mechanism 256 push the portion to the mobile device. At step 560, the request splitter 255 determines whether additional content elements remain. If additional content elements remain, the request splitter 255 returns to step 520. Otherwise, the method ends.

Figure 6:
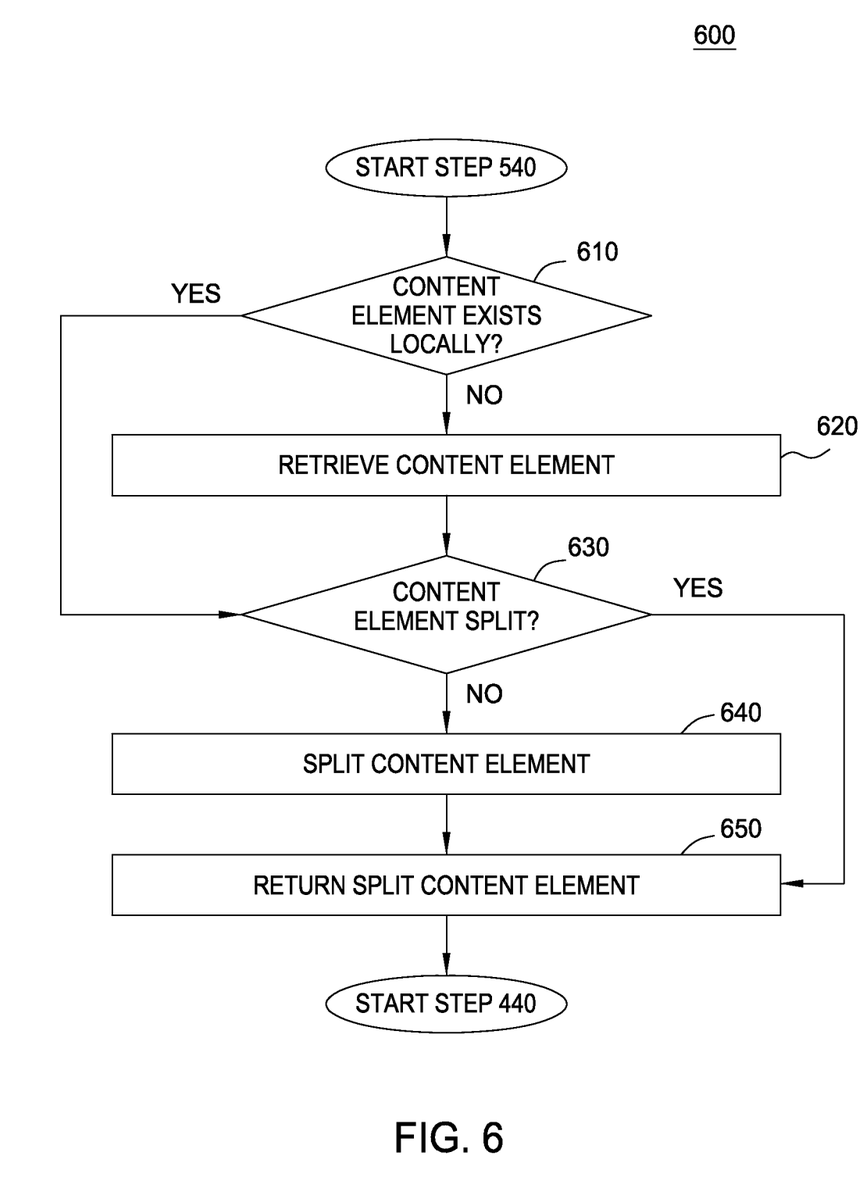
FIG. 6 is a flow chart depicting a method for splitting a large resource, according to one embodiment disclosed herein.

FIG. 6 is a flow chart depicting a method 600 corresponding to step 540 for splitting a large resource, according to one embodiment disclosed herein. In some embodiments, the large resource splitting and push mechanism 256 performs the steps of the method 600. At step 610, large resource splitting and push mechanism 256 determines whether the content element exists locally. In some embodiments, this determination encompasses determining whether the file exists in the file cache 261. A file cache 261 may be maintained to store large files which may be split by the large resource splitting and push mechanism 256, and pushed to mobile devices. If the content element exists locally, the large resource splitting and push mechanism 256 proceeds to step 630. If the content element does not exist locally, the large resource splitting and push mechanism 256 proceeds to step 620. At step 620, the content element is retrieved and placed in the file cache 261. At step 630, the large resource splitting and push mechanism 256 determines whether the content element has been split. In some embodiments, step 630 comprises determining whether a content element has been split into pieces sufficient to optimize the overall transfer, based on, for example, the number of participating peer devices and the speed of their connections. For example, a partitioned content element may need to be reassembled and split into more or fewer pieces than it is currently split into if participating peer devices can or cannot accommodate downloads of existing portions. If the local content element is properly split such that further splicing is not required, the large resource splitting and push mechanism 256 proceeds to step 650. If the local content element is not split, or is not properly split, the large resource splitting and push mechanism 256 proceeds to step 640. At step 640, the large resource splitting and push mechanism 256 splits the local content element. The large resource splitting and push mechanism 256 may split the local content element based on any number of factors, including, but not limited to, the number of mobile devices available to receive a portion, the speed of the network connections of the available mobile devices, and the number of other content elements assigned to the mobile devices. At step 650, the large resource splitting and push mechanism 256 returns the split content element. In some embodiments, at step 650, the large resource splitting and push mechanism 256 returns the split content elements to the request splitter 255 for further processing.

Embodiments disclosed herein therefore improve mobile network download performance by distributing the user's network requests to nearby devices that each have their own network connection. Each device downloads the network resources corresponding to the request it is assigned. The peer devices, upon completing their respective downloads, transmit the content to the original requesting device, where the pieces are assembled to complete the transfer.

Embodiments disclosed herein allow network providers to implement a billing scheme such that all of the bandwidth used for a partitioned request can be charged to the requesting device, regardless of which participating peer devices actually downloaded the resources as part of the request. Embodiments disclosed herein may also be used with heterogeneous networks. If peers are not part of the same mobile network, providers may negotiate incurred charges. For example, the network providers may have an agreement to allow their devices to participate with each other in an ad-hoc peer network as described above. When bandwidth on a different network is used, it is communicated to the requesting device's network provider who can then compensate the other network and charge the requesting device. As described above, this is an additional factor which may be used in determining peer participation.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method, comprising:
    receiving, by a remote server, a request to retrieve a network resource, wherein the request is made by a first device on a mobile network;
    identifying, by the remote server, at least one participating peer device of a plurality of participating peer devices based on a determined likelihood that the at least one participating peer device will remain within a communication range of the first device, wherein the at least one participating peer device is on a local network with the first device, wherein the local network is different than the mobile network;
    partitioning, by the remote server, the request into a plurality of subrequests, wherein the partitioning is based on: (i) a number of content elements of the network resource, (ii) a size threshold for partitioning content elements, and (iii) a size of each of the content elements, wherein each of the subrequests specifies to retrieve at least a portion of one of the content elements; and
    assigning, by the remote server, each of the subrequests to one of the plurality of participating peer devices and the first device based on: (i) a number of subrequests currently assigned to each device, and (ii) a number of the subrequests remaining to be assigned to the participating peer devices;
    wherein each of the participating peer devices and the first device is configured to receive the content elements specified by the respective subrequest assigned to the participating peer devices and the first device; and
    wherein each of the participating peer devices is configured to transmit the retrieved portion of the network resource to the first device over the local network.

2. The computer-implemented method of claim 1, wherein each of the subrequests currently assigned to each device causes the respective device to download the content elements specified in each subrequest, wherein each of the devices are mobile devices, wherein the first device assembles each of the received content elements of the network resource, the method further comprising:
    determining the likelihood that the at least one participating peer device will remain within the communication range of the first device based on: (i) a rate of change of cellular network towers by the first device, (ii) a rate of change of cellular network towers by the at least one participating peer device, (iii) a rate of speed the first device is traveling, and (iv) a rate of speed the at least one participating peer device is traveling.

3. The computer-implemented method of claim 2, wherein at least a first content element of the content elements has a size exceeding the size threshold for partitioning content elements, wherein the method further comprises:
    prior to partitioning the request:
        determining, by the remote server, whether the first content element of the network resource resides in a network cache of the remote server;
        upon determining the first content element does not reside in the network cache, retrieving, by the network cache, the first content element; and
        splitting, by the remote server and based on the number of participating peer devices, the first content element into a plurality of subelements, wherein the request is partitioned to create a subrequest for each of the plurality of subelements, wherein each of the participating peer devices assigned one of the subrequests for the first content element retrieves the corresponding subelements of the first content element from the network cache.

4. The computer-implemented method of claim 3, wherein the request is partitioned into a number of subrequests corresponding to at least the number of content elements.

5. The computer-implemented method of claim 3, wherein the number of subrequests is at least the sum of the count of the participating peer devices and the first device.

6. The computer-implemented method of claim 5, further comprising:
    upon determining that a first one of the participating peer devices is no longer on the local network with the first device, reassigning the subrequests assigned to the first participating peer device to a second participating peer device.

7. The computer-implemented method of claim 6, wherein a first content element of the content elements of the network resource is stored in the remote server prior to receiving the request to retrieve the network resource, and wherein the first content element is sent to at least one of the first device and the participating peer devices by a push mechanism.

8. The computer-implemented method of claim 7, wherein identifying, by the remote server, the at least one participating peer device is further based on each of: (a) whether a candidate peer device is on the same mobile network as the first device; (b) whether the candidate peer device has agreed to be a participating peer device; (c) whether the candidate peer device is idle; and (d) whether the candidate peer device has a network usage below a specified threshold.

9. A computer program product, comprising:
a non-transitory computer-readable storage medium having computer-readable program code embodied therewith, the computer-readable program code executable by a processor to perform an operation comprising:
receiving, by a remote server, a request to retrieve a network resource, wherein the request is made by a first device on a mobile network;
identifying, by the remote server, at least one participating peer device of a plurality of participating peer devices based on a determined likelihood that the at least one participating peer device will remain within a communication range of the first device, wherein the at least one participating peer device is on a local network with the first device, wherein the local network is different than the mobile network;
partitioning, by the remote server, the request into a plurality of subrequests, wherein the partitioning is based on: (i) a number of content elements of the network resource, (ii) a size threshold for partitioning content elements, and (iii) a size of each of the content elements, wherein each of the subrequests specifies to retrieve at least a portion of one of the content elements; and
assigning, by the remote server, each of the subrequests to one of the plurality of participating peer devices and the first device based on: (i) a number of subrequests currently assigned to each device, and (ii) a number of the subrequests remaining to be assigned to the participating peer devices;
wherein each of the participating peer devices and the first device is configured to receive the content elements specified by the respective subrequest assigned to the participating peer devices and the first device; and
wherein each of the participating peer devices is configured to transmit the retrieved portion of the network resource to the first device over the local network.

10. The computer program product of claim 9, wherein each of the subrequests currently assigned to each device causes the respective device to download the content elements specified in each subrequest, wherein each of the devices are mobile devices, wherein the first device assembles each of the received content elements of the network resource, the operation further comprising:
determining the likelihood that the at least one participating peer device will remain within the communication range of the first device based on: (i) a rate of change of cellular network towers by the first device, (ii) a rate of change of cellular network towers by the at least one participating peer device, (iii) a rate of speed the first device in traveling, and (iv) a rate of speed the at least one participating peer device is traveling.

11. The computer program product of claim 10, wherein at least a first content element of the content elements has a size exceeding the size threshold for partitioning content elements, wherein the operation further comprises:
prior to partitioning the request:
determining, by the remote server, whether the first content element of the network resource resides in a network cache of the remote server;
upon determining the first content element does not reside in the network cache, retrieving, by the network cache, the first content element; and
splitting, by the remote server and based on the number of participating peer devices, the first content element into a plurality of subelements, wherein the request is partitioned to create a subrequest for each of the plurality of subelements, wherein each of the participating peer devices assigned one of the subrequests for the first content element retrieves the corresponding subelements of the first content element from the network cache.

12. The computer program product of claim 10, wherein the request is partitioned into a number of subrequests corresponding to at least the number of content elements.

13. The computer program product of claim 10, wherein the number of subrequests is at least the sum of the count of the participating peer devices and the first device.

14. The computer program product of claim 13, the operation further comprising:
upon determining that a first one of the participating peer devices is no longer on the local network with the first device, reassigning the subrequests assigned to the first participating peer device to a second participating peer device.

15. The computer program product of claim 14, wherein a first content element of the content elements of the network resource is stored in the remote server prior to receiving the request to retrieve the network resource, and wherein the first content element is sent to at least one of the first device and the participating peer devices by a push mechanism.

16. The computer program product of claim 15, wherein identifying, by the remote server, the at least one participating peer device is further based on each of: (a) whether a candidate peer device is on the same mobile network as the first device; (b) whether the candidate peer device has agreed to be a participating peer device; (c) whether the candidate peer device is idle; and (d) whether the candidate peer device has a network usage below a specified threshold.

17. A system, comprising:
one or more computer processors; and
a memory containing a program, which, when executed by the one or more computer processors, performs an operation, the operation comprising:
receiving, by a remote server, a request to retrieve a network resource, wherein the request is made by a first device on a mobile network;
identifying, by the remote server, at least one participating peer device of a plurality of participating peer devices based on a determined likelihood that the at least one participating peer device will remain within a communication range of the first device, wherein the at least one participating peer device is on a local network with the first device, wherein the local network is different than the mobile network;

partitioning, by the remote server, the request into a plurality of subrequests, wherein the partitioning is based on: (i) a number of content elements of the network resource, (ii) a size threshold for partitioning content elements, and (iii) a size of each of the content elements, wherein each of the subrequests specifies to retrieve at least a portion of one of the content elements; and assigning, by the remote server, each of the subrequests to one of the plurality of participating peer devices and the first device based on: (i) a number of subrequests currently assigned to each device, and (ii) a number of the subrequests remaining to be assigned to the participating peer devices;

wherein each of the participating peer devices and the first device is configured to receive the content elements specified by the respective subrequest assigned to the participating peer devices and the first device; and wherein each of the participating peer devices is configured to transmit the retrieved portion of the network resource to the first device over the local network.

18. The system of claim 17, wherein each of the subrequests currently assigned to each device causes the respective device to download the content elements specified in each subrequest, wherein each of the devices are mobile devices, wherein the first device assembles each of the received content elements of the network resource, the operation further comprising:

determining the likelihood that the at least one participating peer device will remain within the communication range of the first device based on: (i) a rate of change of cellular network towers by the first device, (ii) a rate of change of cellular network towers by the at least one participating peer device, (iii) a rate of speed the first device is traveling, and (iv) a rate of speed the at least one participating peer device is traveling.

19. The system of claim 18, wherein at least a first content element of the content elements has a size exceeding the size threshold for partitioning content elements, wherein the operation further comprises:

prior to partitioning the request:
  determining, by the system, whether the first content element of the network resource resides in a network cache of the system;
  upon determining the first content element does not reside in the network cache, retrieving, by the network cache, the first content element; and
  splitting, by the system and based on the number of participating peer devices, the first content element into a plurality of subelements, wherein the request is partitioned to create a subrequest for each of the plurality of subelements, wherein each of the participating peer devices assigned one of the subrequests for the first content element retrieves the corresponding subelements of the first content element from the network cache.

20. The system of claim 19, wherein the request is partitioned into a number of subrequests corresponding to at least the number of content elements.

21. The system of claim 19, wherein the number of subrequests at least the sum of the count of the participating peer devices and the first device.

22. The system of claim 21, the operation further comprising:

upon determining that a first one of the participating peer devices is no longer on the local network with the first device, reassigning the subrequests assigned to the first participating peer device to a second participating peer device.

23. The system of claim 22, wherein a first content element of the content elements of the network resource is stored in the remote server prior to receiving the request to retrieve the network resource, and wherein the first content element is sent to at least one of the first device and the participating peer devices by a push mechanism.

24. The system of claim 23, wherein identifying, by the system, the at least one participating peer device is further based on each of: (a) whether a candidate peer device is on the same mobile network as the first device; (b) whether the candidate peer device has agreed to be a participating peer device; (c) whether the candidate peer device is idle; and (d) whether the candidate peer device has a network usage below a specified threshold.

* * * * *